No. 727,973. PATENTED MAY 12, 1903.
J. KLEIN.
ROTARY ORE CLASSIFIER.
APPLICATION FILED JULY 15, 1902.
NO MODEL. 2 SHEETS—SHEET 1.

Witnesses
Alfred W. Eicker
M. L. Irion

Inventor
John Klein
by Higdon & Longan Attys.

No. 727,973. PATENTED MAY 12, 1903.
J. KLEIN.
ROTARY ORE CLASSIFIER.
APPLICATION FILED JULY 15, 1902.
NO MODEL. 2 SHEETS—SHEET 2.
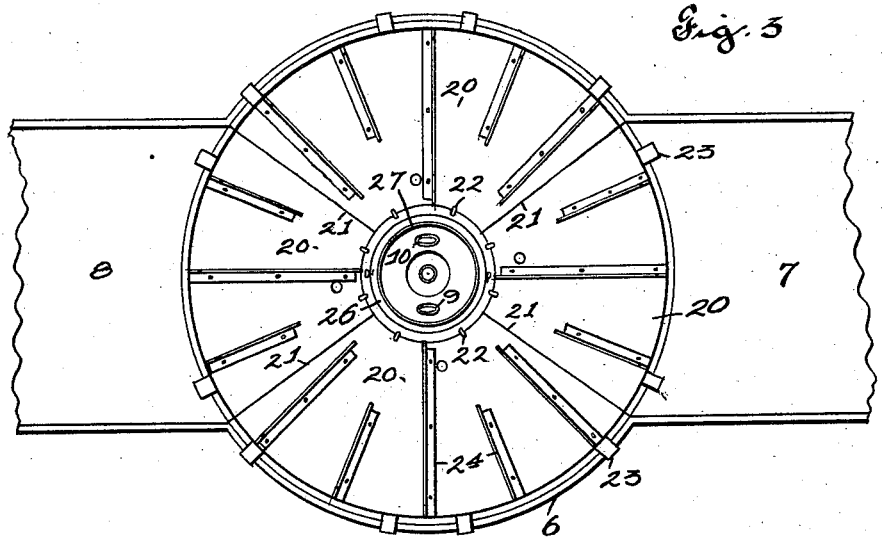
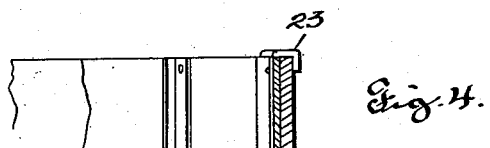
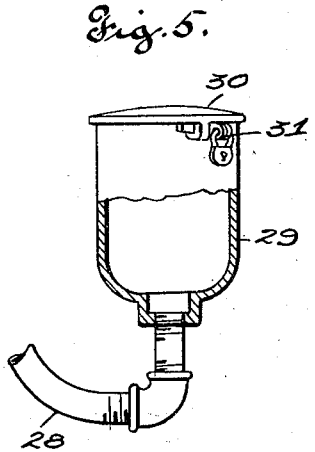
Witnesses
Alfred O. Eicks
M. L. Dixon
Inventor
John Klein
by Higdon & Longan attys No. 727,973. Patented May 12, 1903.

UNITED STATES PATENT OFFICE.

JOHN KLEIN, OF DESLOGE, MISSOURI, ASSIGNOR OF ONE-THIRD TO PAUL A. FUSZ AND CHARLES D. McLURE, OF ST. LOUIS, MISSOURI.

ROTARY ORE-CLASSIFIER.

SPECIFICATION forming part of Letters Patent No. 727,973, dated May 12, 1903.

Application filed July 15, 1902. Serial No. 115,733. (No model.)

*To all whom it may concern:*

Be it known that I, JOHN KLEIN, of the city of Desloge, St. Francois county, State of Missouri, have invented certain new and useful Improvements in Rotary Ore-Classifiers, of which the following is a full, clear, and exact description, reference being had to the accompanying drawings, forming a part hereof.

My object is to construct an improved ore-classifier; and my invention consists of a metallic funnel-shaped hopper, an inlet-trough leading into the top of the hopper, a sludge-outlet trough leading from the top and opposite side of the hopper, an ore-outlet leading from one side of the bottom of the hopper, a water-inlet pipe leading into the opposite side of the bottom, an air-pipe leading into the bottom of the hopper and discharging upwardly between the water-inlet and the ore-outlet, air-pipes leading into and discharging upwardly through the side of the hopper at points above the water-inlet and ore-outlet, an agitator-shaft mounted vertically in a central position in the hopper, agitator-wings mounted upon the shaft, means of driving the agitator-shaft, removable amalgamating-plates mounted in the hopper, riffle-plates attached to the amalgamating-plates, an amalgam-trough mounted in the hopper above the water-inlet and ore-outlet, amalgam-pipes extending outwardly from the amalgam-trough through the wall of the hopper, and amalgam-cups upon the outer ends of said amalgam-pipes.

Figure 1:
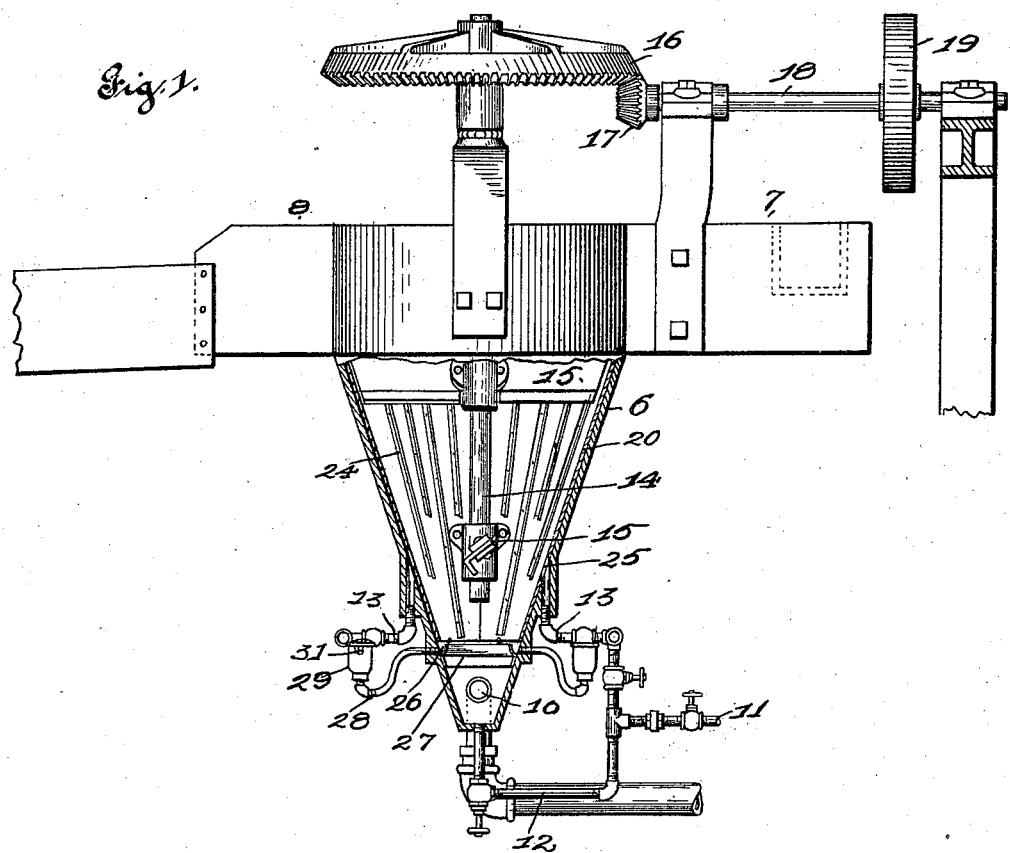
Figure 2:
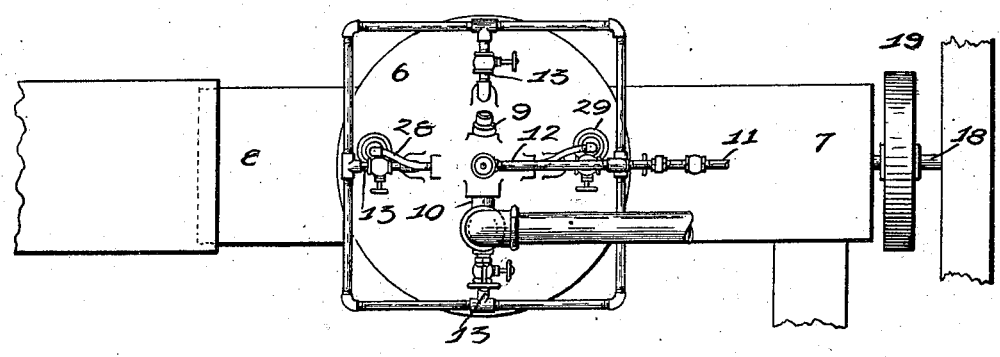

Figure 1 is a view, partly in elevation and partly in section, illustrating my invention. Fig. 2 is a bottom plan view. Fig. 3 is a top plan view upon an enlarged scale, the trough being broken away and the agitator and gearing being removed. Fig. 4 is a sectional detail through the wall of the hopper, parts being broken away to economize space. Fig. 5 is an enlarged detail of one of the amalgam-cups and one of the amalgam-pipes, the pipe being broken away.

Referring to the drawings in detail, the metallic funnel-shaped hopper 6 has the inlet-trough 7 leading into one side of its top and the sludge-outlet trough 8 leading from the opposite side of its top. The ore-outlet pipe 9 leads from one side of the bottom of the hopper, and the water-inlet pipe 10 leads into the opposite side of the bottom. The air-pipe 11 has a branch 12 discharging upwardly through the bottom of the hopper between the outlet 9 and the inlet 10, and said air-pipe 11 has connections 13 leading into and discharging upwardly through the wall of the hopper at points above the outlet 9 and inlet 10, said inlets 13 being arranged around the center of the hopper. The agitator-shaft 14 is mounted in a vertical central position in the hopper, and the agitator-wings 15 extend horizontally from the shaft to near the inner face of the hopper. A beveled gear 16 is fixed upon the upper end of the shaft 14 and meshes with a beveled pinion 17 upon the counter-shaft 18, said counter-shaft being driven by the pulley 19. The amalgamating-plates 20 are adapted to form a sectional lining for the hopper, said plates being divided on lines 21 in Fig. 3. Lugs 22 extend inwardly from the face of the hopper and near its lower end to form stops to be engaged by the amalgamating-plates, and hooks 23 extend upwardly, outwardly, and downwardly to engage the upper edge of the hopper and hold the upper parts of the amalgamating-plates in position. The riffle-plates 24 are secured to the amalgamating-plates and extend downwardly from the upper ends of the amalgamating-plates, said riffle-plates being of various lengths. The riffle-plates are formed of angle-iron, one flange being secured to the amalgamating-plates by rivets and the other flange projecting into the hopper, so as to form obstructions for the material in the hopper when it is being rotated by the agitators, and the small particles of gold will be attracted and collected upon the amalgamating-plates. Openings 25 are formed through the amalgamating-plates to register with the openings to which the air-pipes lead. The annular amalgamating-trough 26 is formed in the hopper near its lower end, the plate 27 forming the inner wall of the trough and the hopper forming the outer wall of the trough. The amalgam-pipes 28 extend outwardly from the trough 26, and the amalgam-cups 29 are mounted upon the outer ends of said pipes. The cups 29 are tightly closed by the caps 30, said caps being secured in position to prevent tampering with the contents of the cups by the locks 31. Suitable amalgamating material is placed in the cups and runs through the pipes into the trough 26.

The operation is as follows: The ore is fed into the hopper through the trough 7. Water under pressure is supplied to the hopper through the pipe 10, said water discharging horizontally into the hopper, and air is forced into the hopper through the pipe 12, said air discharging vertically across the stream of water coming from the pipe 10. Air also passes through the branches 13 and discharges vertically into the hopper. The agitator-shaft 14 is rotated and the ore is thoroughly washed by the combined action of the air and water under the influence of the agitator 15 and the riffle-plates 24. The sludge rises to the top and passes off through the outlet 8. The heavy particles of ore sink to the bottom and pass off through the outlet 9 to a suitable receptacle, and the fine particles of gold are collected upon the amalgamating-plates 20, or if they pass downwardly beyond the influence of the amalgamating-plates they are collected in the amalgam-trough 26 and pass through the amalgam to the cups 29 by the affinity between the gold and the amalgam. At suitable intervals, as desired, the amalgamating-plates 20 are removed and new plates introduced, and the amalgamating material is removed from the cups 29 and new amalgam introduced.

I claim—

1. In an ore-classifier, a hopper having an ore-inlet and a sludge-outlet, a water-inlet arranged to discharge a stream of water in a horizontal plane at a distance above the bottom of the said hopper, an air-pipe arranged to discharge a stream of air laterally of and into the stream of water from said water-inlet, an annular amalgamating-trough in a plane above said water-inlet, pipes extending outwardly from said trough at various points in its circumference, amalgam-cups connected with said pipes, and amalgamating-plates located above said trough with their lower ends terminating adjacent thereto, substantially as herein specified.

2. In an ore-classifier, a hopper having an ore-inlet and a sludge-outlet, a water-inlet arranged to discharge a stream of water in a horizontal plane at a distance above the bottom of the said hopper, an air-pipe arranged to discharge a stream of air laterally of and into the stream of water from said water-inlet, an annular amalgamating-trough in a plane above said water-inlet, pipes extending outwardly from said trough at various points in its circumference, amalgam-cups connected with said pipes, amalgamating-plates located above said trough with their lower ends terminating adjacent thereto, a series of air-pipe connections formed in the said hopper at various points in its circumference in a plane above said amalgamating-trough and arranged to discharge air upwardly into the contents of the hopper, and a mechanical agitator mounted centrally within said hopper, substantially as specified.

3. In an ore-classifier, a hopper having lugs 22 projecting from its interior, amalgamating-plates resting upon said lugs, hooks 23 upon the upper ends of said amalgamating-plates and engaging the upper edge of the hopper, vertical riffle-plates 24 carried by said amalgamating-plates, a mechanical agitator within said hopper, an annular amalgamating-trough 26 arranged beneath the lower ends of said amalgamating-plates, amalgam-cups connected to said trough, and a water-inlet arranged beneath said trough, substantially as specified.

In testimony whereof I affix my signature in presence of two witnesses.

JOHN KLEIN.

Witnesses:
ALFRED A. EICKS,
M. G. IRION.